(12) United States Patent
Johnson et al.

(10) Patent No.: US 7,004,703 B2
(45) Date of Patent: Feb. 28, 2006

(54) PUSH PIN DEVICE

(75) Inventors: Kevin M. Johnson, Natick, MA (US); Ann Sullivan, Waltham, MA (US)

(73) Assignee: Manifold Products, LLC, West Newton, MA (US)

( * ) Notice: Subject to any disclaimer, the term of this patent is extended or adjusted under 35 U.S.C. 154(b) by 0 days.

(21) Appl. No.: 10/824,615

(22) Filed: Apr. 14, 2004

(65) Prior Publication Data
US 2005/0002758 A1    Jan. 6, 2005

Related U.S. Application Data

(60) Provisional application No. 60/462,606, filed on Apr. 14, 2003.

(51) Int. Cl.
*B43M 15/00* (2006.01)
*F16B 15/00* (2006.01)

(52) U.S. Cl. .................................................. 411/439
(58) Field of Classification Search ............... 411/439, 411/923, 480
See application file for complete search history.

(56) References Cited

U.S. PATENT DOCUMENTS

| | | | |
|---|---|---|---|
| 984,190 A * | 2/1911 | Camehl | 411/483 |
| 1,392,950 A * | 10/1921 | Lawrence | 411/522 |
| 1,857,158 A * | 5/1932 | Maloney | 248/685 |
| 1,976,747 A * | 10/1934 | Reuter et al. | 411/516 |
| 2,518,977 A * | 8/1950 | Conway | 24/710.4 |
| 3,955,462 A * | 5/1976 | Thorsman | 411/439 |
| 4,005,507 A * | 2/1977 | Yamazaki | 24/351 |
| 5,393,184 A * | 2/1995 | Beeuwkes, III | 411/469 |
| 6,196,782 B1 | 3/2001 | Wagner et al. | 411/485 |
| 6,276,030 B1 * | 8/2001 | Smith | 24/115 G |

FOREIGN PATENT DOCUMENTS

| | | |
|---|---|---|
| JP | 200196989 | 4/2001 |
| JP | 200196990 | 4/2001 |

OTHER PUBLICATIONS

International Search Report from International Application No. PCT/US04/11499 mailed on Feb. 8, 2005.

* cited by examiner

*Primary Examiner*—Flemming Saether
(74) *Attorney, Agent, or Firm*—Grossman, Tucker, Perreault & Pfleger, PLLC

(57) ABSTRACT

A push pin device comprises a pin having a tip and an outer member coupled to and extending at least partially around the pin. The tip of the pin is located inside of the outer member in a retracted position when the outer member is uncompressed. The tip of the pin is located outside of the outer member in an extended position when the outer member is compressed. In the exemplary embodiment, the pin extends from a first portion of the outer member toward a second portion of the outer member and the first portion contacts the second portion when the outer member is compressed. When the first portion is seated in the second portion, the second portion applies an opposing force against the first portion to facilitate removal.

11 Claims, 2 Drawing Sheets

PUSH PIN DEVICE

CROSS-REFERENCE TO RELATED APPLICATIONS

This application claims the benefit of U.S. Provisional Patent Application Ser. No. 60/462,606, filed on Apr. 14, 2003, now abandoned, which is fully incorporated herein by reference.

TECHNICAL FIELD

The present invention relates to fasteners and more particularly, to a push pin device.

BACKGROUND INFORMATION

Push pins or thumbtacks are used to secure drawings, documents and similar articles on a support surface such as a wall, ceiling or bulletin board. Conventional push pins have a head and a pin projecting outwardly from the head. The pin has a tip for insertion into a support surface. To secure an article to a support surface, the pin is inserted through the article and into the support surface by applying pressure to the head.

One drawback of conventional push pins is the injury that can result from the sharp tip, for example, when push pins are handled by a user. Another drawback of the conventional push pins is the damage that can be caused when the pin pierces the article being secured to the support surface. A further drawback of conventional push pins is the difficulty of removing the push pin and the article when the pin is firmly inserted into the support surface.

Accordingly, there is a need for push pin device that minimizes injury to the user. There is also a need for a push pin device that is easier to remove and that allows a secured article to be more easily removed.

SUMMARY

Consistent with one aspect of the present invention, a push pin device comprises a pin having a tip and an outer member coupled to and extending at least partially around the pin. The tip of the pin is retracted inside of the outer member when the outer member is uncompressed, and the tip of the pin is extended outside of the outer member when the outer member is compressed.

Consistent with another aspect of the present invention, a push pin device comprises a pin having a tip and an outer member coupled to and extending at least partially around the pin. The pin extends from a first portion of the outer member toward a second portion of the outer member. The first portion of the outer member contacts the second portion of the outer member when the outer member is compressed such that the second portion applies an opposing force against the first portion when the pin is extended.

BRIEF DESCRIPTION OF THE DRAWINGS

These and other features and advantages of the present invention will be better understood by reading the following detailed description, taken together with the drawings wherein.

DETAILED DESCRIPTION OF EXEMPLARY EMBODIMENTS

Figure 1:
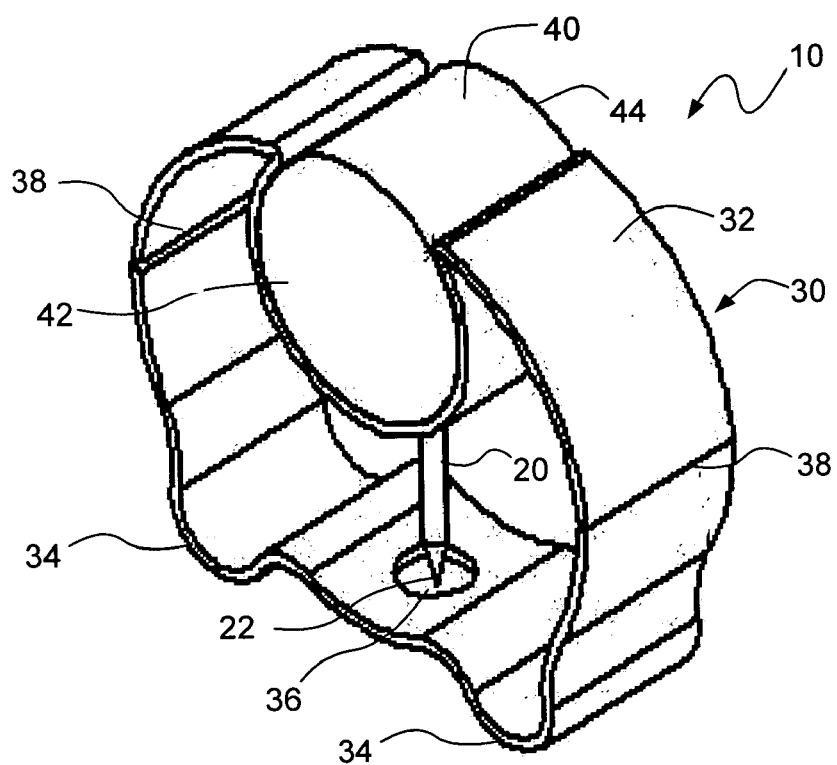
FIG. 1 is a perspective view of one embodiment of a push pin device, consistent with the present invention.
Figure 2:
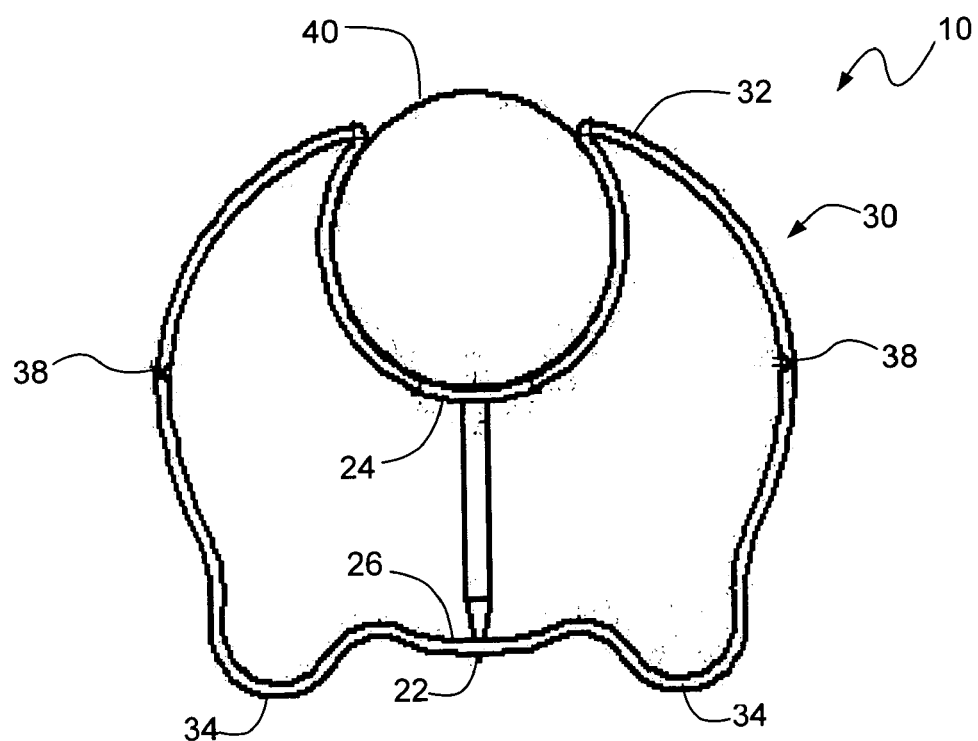
FIG. 2 is a side view of the push pin device shown in FIG. 1.

Referring to FIGS. 1 and 2, the exemplary push pin device 10 includes a pin 20 and a compressible article-engaging outer member 30 that at least partially surrounds the pin 20. The pin 10 is preferably formed of metal, but may be formed of other materials, such as plastic, for example, as long as such material allows the pin to be inserted into the pinnable surface. The pin 20 includes a tip 22 capable of piercing a pinnable surface such as FomCor, Homasote, or cork. Although a conical shaped tip 22 is shown in the exemplary embodiment, other tip configurations and shapes are contemplated.

The pin 20 generally extends from a first portion 24 of the outer member 30 toward a second portion 26 of the outer member 30. When the outer member 30 is in its non-deformed or non-compressed state, the pin 20 is retracted with respect to the outer member 30. When the outer member 30 is compressed, the pin 20 passes through the second portion 26 and is extended with respect to the outer member 30 and the first portion 24 engages the second portion 26 of the outer member 30, as will be described in greater detail below. When the first portion 24 is seated in the second portion 26 of the outer member 30, the second portion 26 applies an opposing force that may facilitate removal of the push pin device 10.

In the exemplary embodiment, the outer member 30 is substantially in the form of a loop 32 of material that encircles the pin 20 (as shown in FIG. 2). In this embodiment, the pin 20 is pointed approximately in a radial direction with respect to the loop 32 and is aligned with an axis that approximately divides the loop 32 into two approximately semicircular portions. However, the outer member may take any of a wide variety of shapes and/or sizes (e.g., sphere, cube, star, or even the shapes of animals or inanimate objects or the like), which may enhance the aesthetic qualities and/or functional qualities of the push pin.

The outer member 30 also includes one or more article-engaging portions, such as protrusions 34, for pressing against and retaining an article to be hung. The outer member 30 can also include an opening 36 in the second portion 26 through which the pin 20 passes when the pin 20 is extended. The outer member 30 can further include hinge points 38 on each side to facilitate compression of the outer member 30.

While such hinge points are illustrated as being preferably at a midpoint on the outer member, it should be appreciated that such hinge points may be placed at any location, such that the hinge points may be altered, thereby effecting the amount of available travel for the pin 20. Accordingly the hinge points 38 can be configured at any location along the outer member 30 to effect the force profile of the pin with respect to the substrate that it ultimately may penetrate.

In a preferred embodiment, the outer member 30 includes inner hinge points 39 positioned above outer hinge points 38, so that upon removal, the device 10 regains its original shape. Such preferred configuration is not absolutely necessary, however, because one can rely upon the use of the second portion 26 to assist in pin removal, as shown in FIGS. 3A–3E and described below.

The outer member 30 can be comprised of a flexible resilient or elastic material, such as a polymer, for example, but may be formed of other compressible materials, such as metal. The member 30 may be molded or formed by any other known processes. The outer member 30 preferably has a spring-like consistency, which is resilient and allows the push pin device 10 to be used multiple times without permanent deformation. In addition, with respect to preferred plastic materials, such materials include thermoplastic type resins, and thermoplastic type elastomers, including, but not limited to polyolefin type materials, such as polyethylene and/or polypropylene. Such materials therefore provide suitable flexibility and capability of repeated flexure, thereby allowing for their use in forming the push pin device of the present invention. In addition, various thermoset type materials may be suitable, including but not limited to elastomeric materials such as polyurethanes, as well as other types of synthetic and/or natural rubber type materials.

The push pin device 10 can also include a grasping member 40, which allows the push pin to be gripped by a user's fingers and pressed into a pinnable surface. The grasping member 40 may be a separate piece attached to the outer member 30 or may be an integral part of or one-piece with the outer member 30. In one embodiment, the grasping member 40 is a cylindrical component having a first end 42 and a second end 44. The first and second ends 42, 44 can be indented to facilitate gripping by a user's fingertips. In other embodiments, the ends 42, 44 may be knurled, grooved, ribbed, or have protrusions or indentations to facilitate gripping. Either the outer member 30 or the grasping member 40 can be molded in a range of different colors to enhance the product's uniqueness and quality.

Referring to FIGS. 3A–3E, the compression of the outer member 30 when the push pin device 10 is used is described in greater detail. When the outer member 30 is uncompressed, the pin 20 is retracted and the tip 22 of the pin 20 is generally located inside of the outer member 30 (see FIG. 3A). As used herein, "generally located inside" of the outer member 30 means that the tip 22 of the pin 20 does not extend beyond the outermost point of the outer member 30. In the retracted position, for example, it is possible that the tip 20 may extend through the opening 36 in the outer member 30 but not beyond the protrusions 34 (see FIG. 2).

Figure 3A:
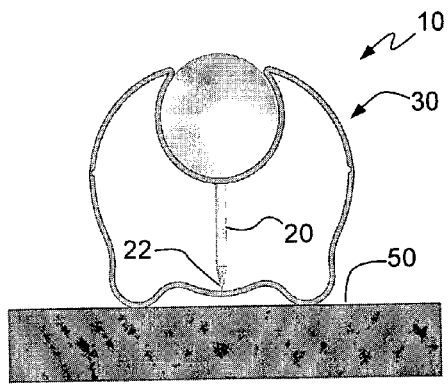
FIGS. 3A–3E are side views of one embodiment of the push pin device as it is compressed and inserted into a pinnable surface.
Figure 3D:
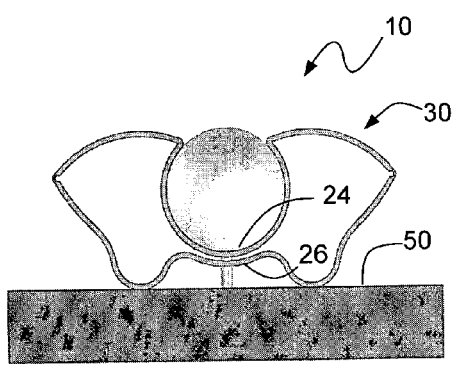
Figure 3B:
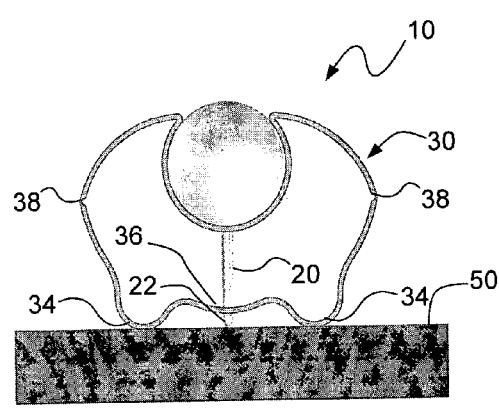
Figure 3E:
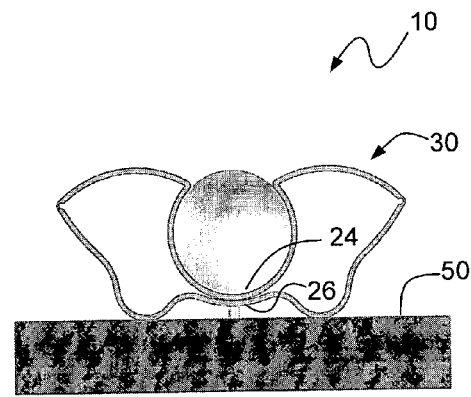
Figure 3C:
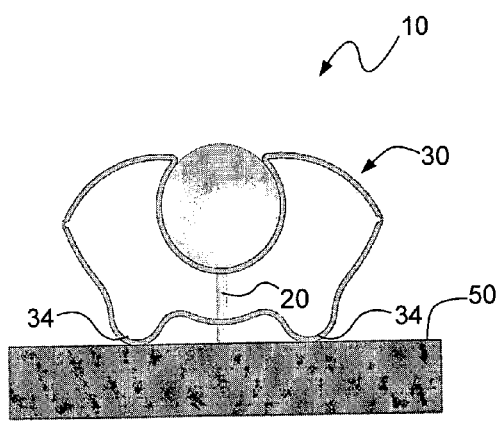

As the outer member 30 is compressed, the outer member 30 bends relatively easily at the hinge points 38 and the pin 20 moves through the opening 36 in the outer member 30 (see FIG. 3B). When the tip 22 moves beyond the protrusions 34, the tip 22 engages the pinning surface 50 (see FIGS. 3B and 3C). At or near the end of the compression, the first portion 24 of the outer member 30 engages the second portion 26 of the outer member 30 (see FIG. 3D). When the first portion 24 is seated in the second portion 26, the second portion 26 applies an opposing force against the first portion 24 (FIG. 3E). This opposing force applied against the first portion 24 facilitates removal of the push pin device 10, and also serves to signal the user that the pin is likely to be sufficiently engaged with a substrate surface. Accordingly, it can be appreciated that preferably, the opposing force is not experienced until the pin is substantially compressed. In that regard, preferably, the compression of the outer member 30 is such that the pin 20 is induced to travel about 90% of its available distance, and in the remaining 10% of its travel, it is engaged with the second portion 26 of the outer member 30. However, in the broad context of the present invention, it can be appreciated that the pin may be designed such that the pin would only travel about 50% of its available distance, at which point it may then be configured to engage with the second portion of the outer member 30 which would provide an opposing force for the remainder of the available travel distance for the pin.

Accordingly, in the broad context of the present invention, the pin may be compressed to any desired level of travel before an opposing force may be supplied, and such variability in design provides for the formation of a push pin of varying structural features and suitability for use on a variety of different substrate surfaces.

According to one method of using the push pin, an article to be hung or secured is placed on a pinnable surface. The push pin device 10 can be aligned so that the pin 20 passes just beyond an edge (e.g., above, below or to the side) of the article to be hung. The pin 20 can be pushed into the pinnable surface so that article-engaging elements (e.g., the protrusions 34) of the push pin device 10 engage and grasp the article to hold the article on the pinnable surface. Thus, the outer member 30 can be pressed against the article to be hung without piercing or damaging the article. Alternatively, the push pin device 10 can be used in a manner that allows the pin 20 to pierce the article being secured.

Accordingly, the outer member of the exemplary push pin device prevents the pin from causing injuries and thus allows the user to carry a handful of push pin devices more comfortably. The push pin device is also capable of holding an article to a vertical surface without piercing the article and allows the user to take down the article without removing the pins, thus making takedown more convenient and preventing damage to the article. The design of the outer member also allows the push pin device to be removed more easily. The exemplary push pin device is also simple to manufacture and may have an engaging aesthetic quality.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A push pin device comprising:
   a pin having a tip;
   a grasping member, wherein said pin extends from said grasping member; and
   an outer member coupled to and forming a loop around said pin, wherein said tip of said pin is refracted inside of said outer member when said outer member is uncompressed, and wherein said tip of said pin is extended outside of said outer member when said outer member is compressed, wherein said outer member includes a first portion coupled to said gasping member, a second portion opposite said first portion, and protruding portions extending outwardly in a direction towards a substrate said second portion on each side of said second portion to engage the substrate, and wherein said first portion of said outer member engages said second portion when said pin is extended into a substrate such that said second portion of said outer member is deflected and applies an opposing force against said first portion.

2. The push pin device of claim 1 wherein said outer member provides an opposing force when said pin is extended.

3. The push pin device of claim 1 wherein said outer member includes an opening through which said pin passes when said outer member is compressed.

4. The push pin device of claim 1 wherein said outer member is elastically deformable.

5. The push pin device of claim 1 wherein said outer member includes at least one hinge point on at least one side portion such that said outer member bends at said hinge point as said pin is compressed.

6. The push pin device of claim 1 wherein said grasping member has a generally cylindrical shape.

7. A push pin device comprising:
   a pin having a tip; and
   an outer member coupled to and forming a loop around said pin, wherein said pin extends from a first portion of said outer member toward a second portion of said outer member, and wherein said first portion of said outer member contacts said second portion of said outer member when said outer member is compressed such that said second portion is deflected and applies an opposing force against said first portion when said pin is extended into a substrate, wherein said outer member includes protruding portions extending outwardly in a direction towards the substrate said second portion on each side of said second portion to engage the substrate, and wherein said outer member includes hinge points at each side portion such that said outer member bends at said hinge points as said pin is compressed.

8. The push pin device of claim 7 wherein said outer member includes an opening through which said pin passes when said outer member is compressed.

9. The push pin device of claim 7 wherein said outer member is elastically deformable.

10. The push pin device of claim 7 further comprising a grasping member, wherein said pin extends from said grasping member.

11. The push pin device of claim 10 wherein said grasping member has a generally cylindrical shape.

* * * * *